United States Patent [19]

Davenport et al.

[11] Patent Number: 4,851,969
[45] Date of Patent: Jul. 25, 1989

[54] OPTICAL CONTROL SYSTEM PARTICULARLY SUITED FOR INFREQUENTLY ACTIVATED DEVICES

[75] Inventors: John M. Davenport, Lyndhurst; Richard L. Hansler, Pepper Pike, both of Ohio

[73] Assignee: General Electric Company, Schenectady, N.Y.

[21] Appl. No.: 290,006

[22] Filed: Dec. 27, 1988

[51] Int. Cl.[4] .............................................. B60Q 1/00
[52] U.S. Cl. ........................................ 362/61; 362/32; 362/802; 361/175; 307/10.1
[58] Field of Search ............... 362/32, 61, 80, 802, 362/183; 350/96.14, 96.2; 361/175; 307/10 R; 180/289

[56] References Cited

U.S. PATENT DOCUMENTS 4,757,212  7/1988  Saito .................................. 307/10 R

*Primary Examiner*—Stephen F. Husar
*Attorney, Agent, or Firm*—John P. McMahon; Stanley C. Corwin; Fred Jacob

[57] ABSTRACT

An optical system that controls the operation of infrequently used electrically activated devices of a vehicle, such as hood or trunk latches or door locks, is disclosed. The optical control system comprises a storage device and an optical device. The storage device, such as a solar battery, is chargeable by the radiant energy of the light source and the electrical power of the battery is applied to the infrequently used activation devices under the control of the optical device, which, in turn, is also controlled by the radiant energy of the light source.

2 Claims, 1 Drawing Sheet

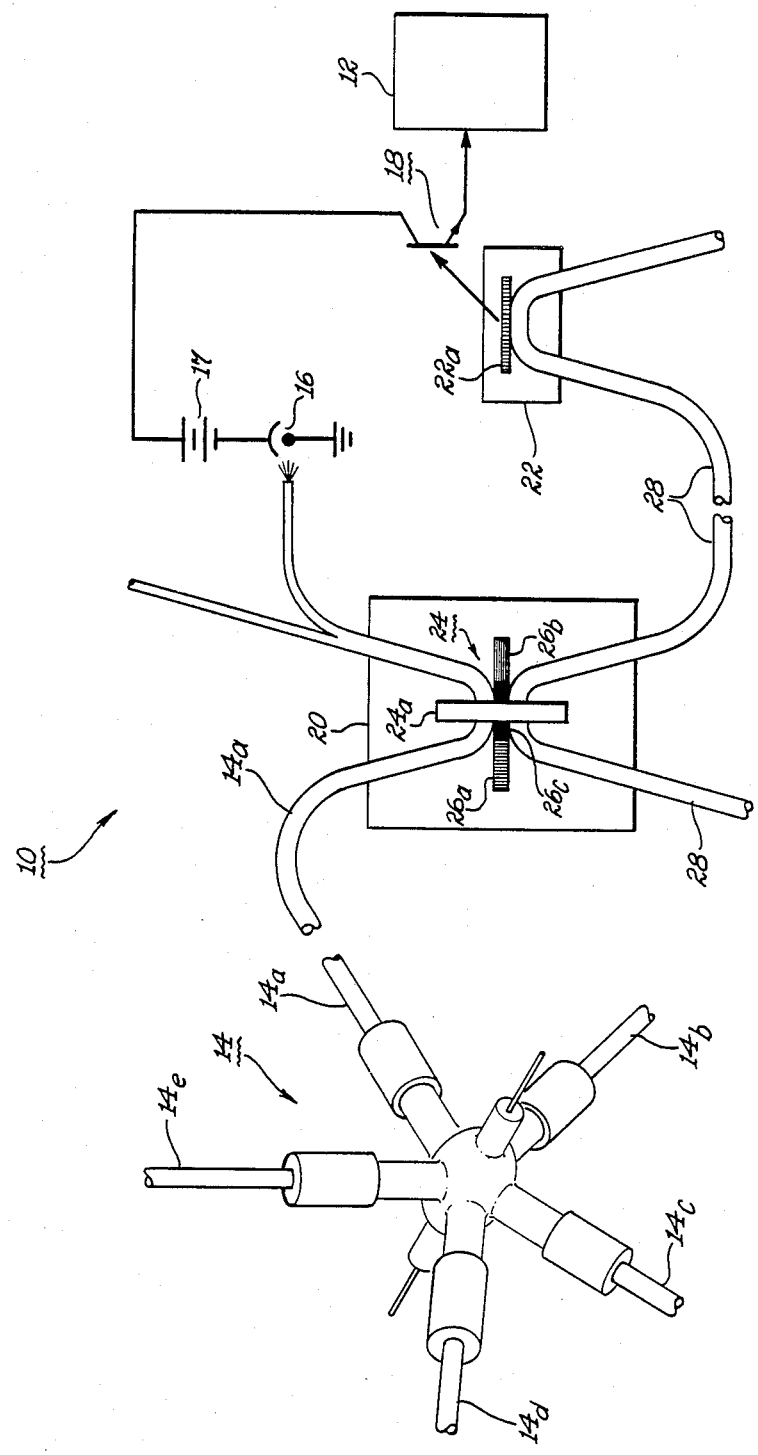

OPTICAL CONTROL SYSTEM PARTICULARLY SUITED FOR INFREQUENTLY ACTIVATED DEVICES

CROSS REFERENCE TO RELATED APPLICATION

U.S. patent application Ser. No. 290,005, of Davenpoet; and Hansler filed concurrently herewith is related to the present invention.

BACKGROUND OF THE INVENTION

The present invention relates to a control system for a vehicle, and more particularly, to an optical system that is particularly suited to provide the control for infrequently used electrically activated devices of a vehicle.

A centralized lighting system is particularly suited for vehicles is disclosed in U.S. patent application, Ser. No. 266,129, filed Nov. 2, 1988, assigned to the same assignee as the present invention, and herein incorporated by reference. The centralized system is comprised of an integrated high-intensity light source which is coupled to optical light guides that provide the lighting needs of the vehicle.

An optical control system that refers to the high brightness light source of Ser. No. 266,129, is disclosed in the cross reference U.S. patent application Ser. No. 290,005, filed 12/27/88, The control system comprises an optical multiplexed scheme for distributing light energy and electrical power within the vehicle in a manner so as to reduce the complexity of the wiring harness of the vehicle.

The above systems, while serving well the needs of the vehicle, have somewhat of a limitation with regard to the servicing or controlling of infrequently activated electrical devices, such as a hood or trunk latch or the door locks of a vehicle. These systems divide or segment the total amount of lumens generated by the high-intensity light source into individual light guides that are routed directly to the various illuminating devices. The light energy is constantly made available or dedicated to the illuminating devices even if these devices are infrequently activated. This dedication is not an efficient use of the light generated by the high-intensity light source. It is desired that the efficiency of the light guides for servicing these infrequently used activation devices be improved so that the overall optical control system may serve the vehicle in a more efficient manner.

Accordingly, it is an object of the present invention to provide an optical control system which efficiently serves the needs of infrequently used electrically activated devices, such as, hood or trunk latches or door locks of a vehicle.

SUMMARY OF THE INVENTION

The present invention is directed to an optical control system that is particularly suited to control infrequently activated electrical devices of a vehicle.

In one embodiment, the optical control system comprises a light source, at least one light buss, an electrical storage device and an optical device. The at least one light buss is routed within the vehicle and has one end coupled to a light source that generates light energy and has its other end exposed so as to be capable of transmitting light energy therefrom. The electrical storage device has a first and a second end and is located proximate to the exposed end of the light buss so as to be capable of being charged by light energy transmitted from the exposed end of the light buss. The optical device has a first, a second and a third section. The first section has connected thereto one end of the electrical storage device. The second section is responsive to the transmitted light from the light buss and the third section is connected to one end of the actuating device. The optical device is rendered conductive by the application of the transmitted light to the second section and thereby causes one end of the energy storing device to be connected to the actuating device.

In a preferred embodiment, the optical control system further comprises a color-coding network and a color-decoding network. The color-coding network has a first extracting means and a filter means which develops at least a first and a second color. The color-coding network has a first and a second input, with the first input being connected to the light buss and the second input being connected to an optical control buss. The first extracting means has the filter means positioned at its central region and is coupled across a portion of both the light buss and the optical control buss. In operation, the first extracting means; (1) extracts a portion of the light energy from within the light buss; (2) causes the extracted light energy to be applied to, and transmitted from the filter means, and (3) causes the light energy from the filter means to be directed into the optical control buss.

The color-decoding network is positioned proximate to the second section of the optical device and has a second extracting device along with a filter means for decoding the first or second color within the optical fiber control buss. In operation, the second extracting means; (1) extracts a portion of the light energy from within the optical fiber control buss, (2) causes the extracted light to be applied to and transmitted from the decoding filter means, and (3) causes the light energy transmitted from the decoding filter to impinge upon the second section of the optical device and thereby render the optical device conductive.

BRIEF DESCRIPTION OF THE DRAWING

FIG. 1 is the only drawing of the present invention and illustrates a schematic block diagram.

DETAILED DESCRIPTION OF THE PREFERRED EMBODIMENTS

Referring to the drawing, FIG. 1 is a schematic block diagram of the optical system 10, which is particularly suited for controlling infrequently used one or more electrically activated devices 12 such as, hood or trunk latches or door locks of a vehicle. An optical multiplexed distribution system that efficiently provides control of the remainder of the lighting and motorized devices of a vehicle is disclosed in the cross referenced U.S. patent application Ser. No. 290,005. The system 10 of FIG. 1 comprises a light source 14, an energy storage device 6, and an optical device 18. Further, the system 10 preferably comprises a color-coding network 20 and a color-decoding network 22. The light source 14 may be of the type described in the aforementioned U.S. patent application Ser. No. 266,129. The light source 14 is centrally located within the vehicle and is of a high brightness level which is more that sufficient to provide all of the lumination needs of the vehicle. The light source 14 generates light energy for a plurality of light busses which are routed within a vehicle and provides the light energy for the vehicle lighting devices. For the embodiment shown in FIG. 1, the light source 14 has five (5) separate light busses shown as 14a, 14b, 14c, 14d and 14e of which buss 14a is of a particular importance to the present invention and which is routed to the color-control network 20.

The color-coding network 20 is primarily comprised of extracting and filter means which may be similar to the type described in the aforementioned U.S. patent application Ser. No. 290,005 with reference to switch element 18 thereof. The color-coding network 20 is comprised of a switch 24 which may be mounted on a panel conveniently to the operator of a vehicle in a manner similar to that described in U.S. patent application Ser. No. 290,005. The central portion of switch 24 encompasses a filter member 26a which may be of a reddish color, a filter member 26b which may be of a bluish color, and an opaque member 26c which separates filters 26a and 26b The switch 24 further comprises an arm 24a which is arranged so as to be pivotable. The purpose of switch 24 is to extract light from the white light within the light buss 14a, pass it through the filter 26a or 26b, each of which pass light of a particular color, and introduce such filtered light into another light buss 28 serving as a control buss.

In general, the color-coding network 20, having a first extracting means, in the form of the switch arm 24a, and filter means in the form of filters 26a and 26b, develops at least a first and a second color. The first extracting means 24 has the filter means 26a and 26b, along with opaque member 26c positioned in its central region and the extracting means 24 is tightly coupled across a portion of both the light buss 14a and the control buss 28. In operation, the extracting means performs three functions which are : (1) extracts a portion of the light energy from within the lighting buss 14a; (2) causes the extracted light energy to be applied to and transmitted from the filter means, and (3) causes the light energy transmitted from the filter means to be directed into the optical control buss 28.

To allow such light extraction from the light buss 14a, the buss 14a is sharply bent, as shown in FIG. 1, so that light leaks from the buss at the bend. If the switch arm 24a is in a position so that the red light is transmitted, that is, the pivotal arm is moved to the left, so that the busses 14a and 28 are in close proximity to the filter 26a, thereby allowing some of the light being transmitted by the buss 14a to pass through filter 26a and then enter the control buss 28.

The control or second buss 28 transfers or carries the interjected light from filter means 26 to the color-decoding network 22. The color-decoding network 22 provides for a sharp bend in buss 28 so as to extract light therefrom in a similar manner as described for network 20. In operation, the extracting means of network 22 performs three functions which are: (1) extracts a portion of the light energy from within the buss 28, (2) causes the extracted light energy to be applied to and transmitted from the filter means 22a which for the embodiment shown in FIG. 1 passes the same color as filter 26a and (3) causes the light energy transmitted from the filter means 22a to impinge onto a second section of the optical device 18.

The optical device 18 has a first, a second, and a third section. The first section is connected to one end of the energy storage device 16. The second section is located proximate to the filter 22a of the color-coding network 22 so as to receive the light transmitted by the filter 22a. The third section of the optical device is connected to one end of the electrically activated device 12. In operation, the optical device 18 is rendered conductive by the light energy from the filter means 22a impinging onto its second section and thereby causes one end of the energy storage device 16 to be connected to the third section of device 18, which, in turn, causes the activation of the device 12.

The energy storage device 16 may be of a low leakage capacitor or more preferably, a solar cell 16 that provides the electrical energy for a long-life battery such as a nickel/cadmium cell 17. The solar cell 16 has a first and a second end and is located proximate to an exposed end of the light buss 14a. The light energy emitted from the exposed end of light buss 14a causes the solar cell 16 to produce electrical energy and charge the battery.

In operation, the high intensity light source 14 may be selected to have an operational rating of about 50 watts. The light source 14, typically having five light guides 14a–14e and an efficiency of about 50 lumens per watt, makes available approximately 500 lumens at each of the light guide, such as 14a. For the application related to the present invention and considering a relatively low overall generation, transmission and conversion efficiency of between 1–5% of the light energy utilized to charge the battery 17, allows for a low value of about 100 mw to be made available to charge the battery. Considering a typical 1.5 volt battery and making available 67 ma of current (100 mw/1.5 v) for charging, the solar cell maintains the battery in its charged state to supply the necessary energy to efficiently operate and control infrequent activated electrical devices of the vehicle, such as hood or trunk latches or door locks when requested by the operator's manipulation of switch 24.

One of the benefits of the present invention is the mounting features that it allows that is, a relatively small solar cell and battery along with an optical device 18 may be mounted in the confined spaces such as inside the door, hood or trunk lid so as to conveniently provide the power to where the electrical operated latching devices are located without running an electrical power line to these devices. The light buss 14a, along with the control buss 2, are routed to the solar cell and battery and optical device and the arrangement of the present invention allows the operator to manipulate the appropriate switch 24 so as to control the activation of the related one or more devices 12.

It should now be appreciated that the present invention provides a system for remote activation and control of infrequently used electrically activated devices. The primary source of energy to control the system is provided by a high intensity light source generating radiant energy. The radiant energy is transmitted by a light buss and is of a sufficient amount to allow remotely located energy converting cells, such as a solar cell, to change the radiant energy, into electrical energy, which may then be stored in long-life batteries. A switch is provided so that some of the light from the light buss is distributed by a second buss to the phototransistor, which, in turn, controls the power that is applied to the infrequently activated device.

Although FIG. 1 illustrates a single infrequently activated device controllable by a single switch having the red filter means 26a, it should be recognized the switch further comprises the blue filter means 26b as to provide at least control of two separately activated devices from the same control buss. Other switches having associated filter means may be provided to control other electrically activated devices.

Further, if desired the color-coding and color decoding network may be removed from the practice of this invention by providing, preferably for each electrically activated device to be controlled, an optical switch similar to switch 24, to be coupled to the light buss 14a. This optical switch provides controllable light energy output from optical fibers to impinge on the second section of the optical device 18 so as to yield control thereof.

What we claim as new and desire to secure by Letters Patent of the United States is:

1. An optical system to control electrically activated devices of a vehicle comprising:
   (a) a light source that generates light energy;
   (b) at least one first light buss having one end which is coupled to said light source, said first light buss being routed within said vehicle and having its other end exposed so as to be capable of transmitting light energy;
   (c) an energy storage device having a first and a second end and located proximate to said exposed end of said light buss, said storage device being capable of seeking and obtaining its charged condition by being subjected to the transmitted light of said exposed end of said first light buss;
   (d) an optical switch coupled to said at least one first light buss and providing a controllable light energy output; and
   (e) an optical device having a first, a second and a third section, said first section having connected thereto one end of said energy storage device, said second section being responsive to light energy generated by said light source and controlled by said optical switch, and said third section being connected to one end of said electrically activated device, said optical device being rendered conductive by the application of said light energy controlled by said optical switch to said second section and thereby causing said one end of said energy storage device to be connected to said electrically activated device.

2. An optical control system according to claim 1 wherein said optical switch comprises:
   (a) a color-coding network having a first extracting means and filter means for developing at least a first and second color, said color-coding network having a first and a second input, said first input having connected thereto said light buss and said second input having connected thereto a second light buss, said first extracting means having said filter means positioned in its central region and coupled across a portion of both said first light buss and said second buss, said extracting means being capable of; (1) extracting a portion of the light energy from within said first light buss, (2) causing said extracted light energy to be applied to and transmitted from said filter means, and (3) causing said light energy transmitted from said filter means to be directed into said second buss; and
   (b) a color-decoding network positioned proximate to said second section of said optical device and having a second extracting means along with a filter means for decoding the first or second color within said second light buss, said second extracting means being capable of; (1) extracting a portion of the light energy from within said second light buss, (2) causing said extracted light energy to be applied to and transmitted from the decoding filter means; and (3) causing said light energy transmitted from said decoding filter means to impinge upon said second section of said optical device and thereby rendering said optical device conductive.

* * * * *